United States Patent [19]
Moody et al.

[11] Patent Number: 5,120,513
[45] Date of Patent: Jun. 9, 1992

[54] RECOVERY OF ALUMINA FROM BAUXITE

[75] Inventors: Gillian M. Moody, Brighouse; Trevor K. Hunter, Leeds; Christine A. Rushforth, West Yorkshire, all of England

[73] Assignee: Allied Colloids Limited, Great Britain

[21] Appl. No.: 381,507

[22] Filed: Jul. 18, 1989

[30] Foreign Application Priority Data

Jul. 18, 1988 [GB] United Kingdom ............... 8817049
Oct. 14, 1988 [GB] United Kingdom ............... 8824175

[51] Int. Cl.$^5$ .................................................. C02F 1/54
[52] U.S. Cl. .................................... 423/111; 423/122
[58] Field of Search ................................ 423/111, 122

[56] References Cited

U.S. PATENT DOCUMENTS

| | | | |
|---|---|---|---|
| 3,390,959 | 7/1968 | Sibert | 423/122 |
| 4,335,082 | 6/1982 | Matyasi et al. | 423/122 |
| 4,789,485 | 12/1988 | Field | 423/122 |
| 4,839,060 | 6/1989 | Yong | 423/111 |

FOREIGN PATENT DOCUMENTS 1045545 10/1966 United Kingdom .
2112366 7/1983 United Kingdom .

OTHER PUBLICATIONS

"Synthetic Flocculant Technology in the Bayer Process" by L. J. Connelly et al., Nalco Chemical Company, pp. 61-68.

Primary Examiner—Peter D. Rosenberg
Attorney, Agent, or Firm—Ostrolenk, Faber, Gerb & Soffen

[57] ABSTRACT

A Bayer alumina recovery process is described in which lime is added at an intermediate or final wash stage of the red mud recovery circuit to improve flocculation, especially with flocculants having lower anionic content. The process is particularly useful with liquors containing high amounts of sodium carbonate and for process where the mud is settled by mud stacking.

12 Claims, No Drawings

RECOVERY OF ALUMINA FROM BAUXITE

The Bayer process for recovering alumina from bauxite is well known and comprises digesting the bauxite in an aqueous alkaline liquor that acquires a sodium aluminate content, and the insoluble residue is separated in a primary settler stage from the digestion liquor as red mud.

The red mud is then washed in a plurality of sequential wash stages in each of which the red mud is washed with a wash liquor from a later wash stage, flocculated with a flocculating agent and separated from the wash liquor. The washed red mud is then washed in a final wash stage with a final wash liquor, flocculated with a final flocculating agent, and settled.

Lime has been added to the primary settler stage in order to react with the liquor to reform sodium hydroxide, which can then be reused in the digestion.

In JP-A-47-21392 calcium compounds, including lime, are added to an early stage in the Bayer process, for instance during the digestion/extraction stages or the primary mud settler in conjunction with a polyacrylate flocculant as coagulants.

In JP-B-69-24892 (1969) calcium compounds including lime and calcium carbonate, are added with polyacrylate flocculants in the primary settler of the Bayer process.

In JP-B-74-18558 (1974) calcium compounds are added to the bauxite during the digestion/extraction stage. Polyacrylate flocculants are added to flocculate the red mud in the red mud recovery circuit.

In DE-A-3040773 lime is added to recirculating wash water to remove organic compounds such as oxalates and humates. In HU-A-19472 lime is added to aluminate liquor after solids removal, to remove residual ferric oxide and silica.

Also, in some work that we have conducted we have added lime to the first washer stage for the same purpose, since the liquor from the first washer stage is passed back to the primary digester.

The flocculating agents are used to improve the flocculation process in each stage, for instance by increasing the rate of settling, improving the clarity of the supernatant liquor (by reducing residual suspended solids) and/or increasing the density of the settled solids.

The flocculating agents are usually anionic and it is known that the optimum anionic content, for optimum settling, is usually related to the alkalinity of the wash liquor, with the early wash liquors (having the highest alkalinity) requiring more highly anionic polymers than the later wash liquors. In order to select, in advance, an anionic polymer that is likely to be suitable for a particular washer stage, it is therefore convenient to measure the alkalinity (for instance expressed as NaOH or as $Na_2O$) and then select the anionic content according to the measured alkalinity, with the highest values of alkalinity requiring the highest anionic content.

For instance optimum settlement is often achieved in the early wash liquors (which have the highest alkalinity) using sodium or ammonium polyacrylate homopolymer or a copolymer with, for instance, 10% acrylamide whereas optimum settlement is usually achieved in the later wash liquors (having lower alkalinity) using copolymers of sodium or ammonium acrylate and, for instance, 50% by weight acrylamide.

The red mud from the final wash stage is often settled in lagoons but it can be, for instance, settled while flowing down a mud stack.

It is, of course, desirable that the settled red mud from the final stage should be as dense as possible and should contain a minimum of liquor. This has the advantage of minimizing the amount of aqueous alkaline liquor that can escape into the environment (since the liquor that separates relatively quickly during the settling can be reused as a wash liquor). Also the increased density can facilitate the handling or flow properties of the mud. This is particularly important during the mud stacking process since if the settled mud contains too much liquor the mud will have a viscosity that is too low for satisfactory stacking.

Despite the accepted desirability, from the point of view of flocculation performance, to use a flocculant of medium anionic content in the later stages, it has become found that in some instances the use of such a material in the final wash stage tends to lead to a mud that, after settlement, has a density that is too low, especially for mud stacking. Although the alkalinity of the wash liquor in the final stage is relatively low, thus suggesting the use of a polymer of relatively low anionic content, it has been found that some improvement in mud density can be achieved if the final flocculant is much more highly anionic than would be indicated by the alkalinity of the final wash liquor, for instance being sodium polyacrylate homopolymer. However the results are still rather unsatisfactory even when using this material.

We have also found that there are other instances where the flocculation performance of an anionic polymer is worse than would be expected having regard to its anionic content and the total alkalinity of the liquor.

We have now surprisingly found that when the flocculation performance is worse than would be expected, having regard to the alkalinity of the liquor and the anionic content of the polymer, it is surprisingly possible to obtain a significant improvement in flocculation performance by adding lime (calcium hydroxide) to the liquor that is being flocculated.

Work subsequent to the invention has demonstrated that the flocculation performance does not, despite all the prior belief, depend upon total alkalinity but instead depends upon the chemical type of alkalinity as well as the total alkalinity, and in particular we now realize that the presence of sodium carbonate in significant amounts detrimentally affects flocculation performance.

Accordingly the addition of lime to the primary washer stage can be beneficial not only because it regenerates caustic soda for the digestion stage but also because it converts the alkalinity to a form where better flocculation can be achieved, with any particular anionic flocculant, than in the absence of lime.

However this addition of lime to the primary stage, irrespective of its benefit on the flocculation performance in that stage, will have no effect on the flocculation performance in the later stages since the liquor that has been treated with lime goes back into the settler stage and does not go to the later stages. Thus any benefit of lime addition in one stage is directed solely at that stage or in a preceding stage, and there can be no benefit on the flocculation performance in a subsequent stage due to lime addition in a preceding stage.

The present invention is directed to the surprising discovery that flocculation performance in the second or subsequent washer stages can be improved by adding lime to any or all of these. Prior to the invention, lime would probably never have been added to any of these stages since it might not have resulted in the formation of a significant amount of sodium hydroxide for recycling to the digestion stage, no benefit for doing it was known or expected, it is generally considered undesirable to add materials that are not required in any particular flocculation process, and it would have incurred unnecessary cost increases.

Thus a Bayer alumina recovery process according to the invention comprises digesting bauxite in an alkaline liquor and the resultant red mud is separated from the digestion liquor and is then washed in a plurality of sequential wash stages comprising a first wash stage and one or more intermediate wash stages in each of which the red mud is washed with a wash liquor from a later wash stage, flocculated with a flocculating agent and separated from the wash liquor, and the washed red mud is then washed in a final wash stage with a final wash liquor, flocculated with a final flocculating agent and settled, and in which lime is included in the wash liquor of at least one wash stage selected from the intermediate and final wash stages.

The invention is of particular value when the wash liquor that is being considered has a relatively high proportion of its alkalinity due to sodium carbonate and/or when particularly good mud densities, rates of settlement or liquor clarity are required.

The amount of lime that should be added to the wash stage can best be determined by testing the effect of various amounts of lime and observing the physical parameters of most importance, for instance density and/or rheology, clarity or settlement rate. The amount depends in part on the alkalinity and amount of the final wash liquor but is usually in the range 2 to 25 grams calcium hydroxide per 1 of red mud and final wash calcium hydroxide per liter of red mud and final wash liquor. The amount of lime that is added is usually not more than 15g/1 and often it is not more than 10g/1. Often it is at least 5g/1.

We assume that the calcium hydroxide reacts with sodium carbonate in the wash liquor to form calcium carbonate precipitate, and sodium hydroxide. The precipitation of the calcium carbonate does increase somewhat the solids in the system but any disadvantage in this is more than offset by the improved characteristics of the settled solids and the supernatent.

Although we could not, prior to the invention, understand why improved settlement was obtained using a flocculant that was more highly anionic than general considerations would indicate as desirable, we now believe that the alkalinity in the final wash liquor may be due to a much higher proportion of sodium carbonate than had previously been recognized. Thus the alkalinity is due to, for instance, a mixture of sodium hydroxide and sodium carbonate and we now believe that when the sodium carbonate predominates the flocculant needs to be more anionic than would normally be expected and, even then, gives worse results than would be expected. By adding lime the sodium carbonate is reduced or eliminated, by being precipitated and removed as calcium carbonate.

In contrast to the effect of the calcium compound in JP-A-47-21392 (discussed above) which acts as a coagulant in the present process the calcium is removed as the insoluble carbonate.

Support for this theory comes from the fact that the invention is of particular value in processes where the settlement is conducted under conditions such that the liquor that separates from the settled mud is exposed to air during the settlement and is then recycled into the final wash liquor. Thus the invention is of particular value during the described mud stacking process. Presumably sodium carbonate is formed during the stacking, as a result of the exposure of the mud to air as the mud flows down the stack.

The use of lime in the final stage has been found to be of particular benefit as it is found that maximum conversion of sodium carbonate to calcium carbonate and caustic soda is achieved. For instance it has been found that conversion rates in the range 85-90% conversion can be achieved whereas in earlier stages of the washing process the rate of conversion is often less than 80%. A further advantage of addition of lime in the final stage is that the precipitated calcium carbonate is removed once and for all with the mud, never to be returned to the circuit, which also avoids the processing of higher amounts of solids in the earlier stages.

Since the invention is of particular value when the lime is added to the final stage, the following description is written primarily in terms of this.

In such a process it is then possible to obtain optimum mud density using a polymer having an anionic content of the type that would conventionally have been expected to be optimum for the final wash stage, e.g., a copolymer of 5 to 80, generally 15 to 50 and most preferably 20 to 30, weight percent acrylamide with the balance sodium polyacrylate or other alkali metal or ammonium salt of acrylic acid or other suitable monoethylenically unsaturated carboxylic or sulphonic acid such as methacrylic acid, allyl sulphonic acid or 2-acrylamido methyl propane sulphonic acid. However polymers having a higher anionic content, e.g., sodium polyacrylate homopolymer, can still be used if desired.

In addition to giving increased mud density and permitting the use of a less anionic polymer, the addition of lime can give other advantages. In particular, it is possible to improve the rheology of the settled mud so as to make it much more suitable for mud stacking, and it is possible to obtain a higher settling rate for the mud and an increased clarity of the supernatent.

The invention is of particular value when the mud from the final stage is settled by mud stacking. Thus the washed mud from the final stage may be pumped to the top of a gentle slope (typically at an angle of about 7° and in a layer about 8cm thick). It flows gradually down the stack and liquor is collected from it and recycled for use in the final wash liquor. By the invention it is possible to optimize the rheology of the flow down the stack and thereby avoid the problems that have been encountered of the mud either being too thick and lumpy to flow or, more usually, flowing too thinly and quickly down the stack.

The alkalinity of the final wash liquor, without the lime addition, is generally in the range 10 to 50g/1 total caustic, expressed as $Na_2O_3$, often around 15 to 35g/1.

The invention is of particular value when at least 50%, for instance, 70 to 95% or more of the alkalinity in the relevant wash liquor is present as $Na_2O_3$. Thus the invention is of particular value when the $Na_2O_3$ content of the final wash liquor is 10 to 50g/1, usually 10 to 35, especially 15 to 30g/1.

The solids content of the red mud that is introduced into the final wash stage (i.e., the insoluble material in the wash stage excluding calcium carbonate formed during the stage) is typically above 10g/1 and often about 20g/1. Usually it is below 100g/1 and frequently below 50g/1.

The overall preferred process can, apart from the lime addition to an intermediate or final stage, be conventional. Thus the digestion is typically conducted using hot (e.g., 100° C.) alkaline digestion liquor typically having an alkalinity of 150 to 250g/1 $Na_2O$, to form a liquor containing sodium aluminate from which aluminum hydroxide is precipitated. Lime can be added to convert sodium carbonate back to sodium hydroxide and the resultant liquor recycled. Separation of the liquor from the insoluble components, known as red mud, is promoted by the inclusion of a flocculant that can be starch but is usually a polymer of sodium acrylate (or other anionic ethylenically unsaturated monomer) with 0 to 20 weight percent, usually 0 to 10% acrylamide.

The red mud from this primary settler stage is taken to a first wash stage where it is washed with a wash liquor, flocculated with a flocculating agent, separated from the wash liquor, and passed to the second wash stage. The wash liquor that is separated in the first stage is generally passed to the digestion stage and the wash liquor that is used in the first stage is generally recovered from the second stage. The process is generally repeated through a series of, in total, 4 to 10 wash stages, often 5 to 7 wash stages, prior to the final wash stage described above. The washed mud from this is settled in a mud stack, lagoon or any other convenient position, with the supernatent liquor from the settlement generally being recycled for use as part or all of the final wash liquor.

The polymers used as flocculating agents are usually synthetic anionic polymers, for instance those described above, although additional comonomers can be included either as relatively inert diluents or to increase the activity. For instance methylol acrylamide units may be included in a minor proportion, e.g., as described in U.S. Pat. No. 3,975,496.

The amount of polymer in each of the stages is usually conventional, typically in the range 0.5 to 20, most preferably 1.0 to 10, mg/1. The polymer normally has a high molecular weight, generally above 0.5 million and preferably above 1 million, the intrinsic viscosity being at least 6dl/g, preferably at least 8dl/g or even more than 15dl/g, and should be linear, in order that it is satisfactorily soluble in the liquor. The polymer may be supplied as a reverse phase dispersion but preferably it is supplied as a gel or bead polymer, for instance as a powder, which is dissolved into water or plant liquor before use.

EXAMPLE 1

A red mud slurry was formed having a composition similar to the composition of the final, wash stage in a process where the washed red mud is settled on a mud stack and the supernatant from the mud stack is used in the final wash liquor. Such a slurry is formed of 25g/1 red mud and 33g/1 sodium carbonate. A high molecular weight water soluble anionic flocculant formed of 77 weight percent sodium acrylate and 23 weight percent acrylamide was added at 1, 2 or 3g/1 and lime was added at various amounts. The settlement rate was recorded in centimeters per minute. The density of the settled phase was measured as % w/v after 10 minutes settlement and after 20 minutes settlement. The clarity of the supernatent was recorded after 10 minutes settlement. The results are given in the following table.

| Polymer (mg/l) | Ca(OH)$_2$ (g/l) | Settlement Rate (cm/min) | Density 10 mins | Density 20 mins | Clarity of Supernatent |
| --- | --- | --- | --- | --- | --- |
| 1 | 0 | 11.3 | 19.2 | 23.6 | 276 |
| 2 |   | 13.7 | 19.2 | 23.1 | 247 |
| 3 |   | 16.2 | 19.2 | 23.1 | 246 |
| 1 | 2.5 | 13.4 | 21.9 | 26.8 | 235 |
| 2 |   | 26.0 | 23.7 | 26.8 | 222 |
| 3 |   | 32.7 | 24.9 | 26.8 | 214 |
| 1 | 5 | 14.2 | 26.4 | 29.9 | 231 |
| 2 |   | 43.7 | 26.4 | 29.9 | 220 |
| 3 |   | 59.9 | 27.8 | 29.9 | 215 |
| 1 | 10 | 23.1 | 29.6 | 33.8 | 230 |
| 2 |   | 45.0 | 29.6 | 29.6 | 200 |
| 3 |   | 83.6 | 29.6 | 29.6 | 200 |
| 1 | 15 | 32.8 | 31.4 | 34.8 | 200 |
| 2 |   | 37.5 | 28.3 | 31.0 | 112 |
| 3 |   | 47.6 | 28.3 | 31.0 | 74 |
| 1 | 25 | 22.1 | 30.9 | 30.9 | 100 |
| 2 |   | 14.9 | 23.5 | 24.5 | 30 |
| 3 |   | 12.9 | 22.6 | 22.6 | 18 |

The flock structure was observed and improved with increasing amounts of lime. The rheology of the settled layer was also observed and it was found that the rheology at about 5g/1 lime was significantly better, from the point of view of mud stacking, than the rheology in the absence of lime. There was further improvement in rheology at higher lime amounts but the increased volume of the precipitate (due to the increased amount of calcium carbonate introduced by the lime) indicated that, when rate of settling and mud density are the most important, lime amounts of 5 to 10g/1 are particularly suitable, but when the clarity of the supernatent is also important then higher lime amounts may be preferred.

EXAMPLE 2

A red mud slurry as in example 1, without any addition of lime, was treated with 3mg/1 of the polymer of example 1 and gave a solids density, after two hours settling, of 32.9%. When the copolymer of example 1 was replaced with an equal amount of sodium polyacrylate homopolymer (added as a reverse phase dispersion) the solids density increased slightly to 33.6%. However when the copolymer was used together with 5g/1 lime the solids density increased significantly, to 36.3%. When lime was added with the homopolymer, a lower solids density was obtained.

EXAMPLE 3

A red mud slurry as in example 1 was prepared, containing 33g/1 sodium carbonate. Another slurry was prepared with 10g/1 lime as well as the sodium carbonate. Settling tests were carried out in the presence of 5mg/1 of each of the following flocculants:

A. Sodium acrylate homopolymer with intrinsic viscosity 12.9dl/g.

B. 95:5(wt) sodium acrylate acrylamide copolymer intrinsic viscosity 13.4dl/g.

C. 77:23 Sodium acrylate acrylamide copolymer intrinsic viscosity 20.6dl/g.

D. Ammonium acrylate homopolymer, intrinsic viscosity 14.5dl/g.

The slurry was allowed to settle for one hour after mixing. The supernatant was removed and the density of the underflow was then measured in g/ml. For the two homopolymers, A and D and the copolymer with the higher anionic content, B, the incorporation of lime reduced the specific gravity of the underflow from around 1.235–1.240 to around 1.20–1.21, the greatest effect being with use of the sodium acrylate homopolymer. For the copolymer with the lower anionic content, C, the incorporation of lime increased the specific gravity from 1.179 to 1.234.

We claim:

1. A Bayer alumina recovery process in which bauxite is digested in an alkaline liquor and the resultant red mud is separated from the digestion liquor and is then washed in a plurality of sequential wash stages comprising a first wash stage and one or more intermediate wash stages in each of which the red mud is washed with a wash liquor from a later wash stage, flocculated with a flocculating agent and separated from the wash liquor, and the washed red mud is then washed in a final wash stage with a final wash liquor, flocculated with a final flocculating agent and settled and is characterized in that the flocculating agent is synthetic and lime is included in the wash liquor of at least one wash stage selected from the intermediate and final wash stages, the wash liquor of the at least one wash stage comprising $Na_2CO_3$ in an amount of at least 10 g/l.

2. A process according to claim 1 in which at least 80% of the alkalinity in the wash liquor to which lime is added is present as $Na_2CO_3$.

3. A process according to claim 1 in which lime is added in the final wash stage.

4. A process according to claim 3 in which the $Na_2CO_3$ content of the final wash liquor is in the range 10–50g/l.

5. A process according to claim 1 in which the lime is added to the liquor in an amount in the range 2–25g/l.

6. A process according to claim 1 in which the flocculant that is used in the stage to which lime is added is a copolymer formed from 20–95%, by weight ethylenically unsaturated anionic monomer with 80–5%, by weight ethylenically unsaturated comonomer.

7. A process according to claim 6 in which the aniomic monomer is selected from unsaturated sulphonic acids and carboxylic acids, and in which the comonomer is an unsaturated non-ionic compound.

8. A process according to claim 6 in which the copolymer flocculant is added to the slurry in an amount of 0.5 to 20mg/l.

9. A process according to claim 1 in which the red mud from the final wash stage is settled by mud stacking.

10. A Bayer alumina recovery process in which bauxite is digested in an alkaline liquor and the resultant red mud is separated from the digestion liquor and is then washed in a plurality of sequential wash stages comprising a first wash stage and one or more intermediate wash stages in each of which the red mud is washed with a wash liquor from a later wash stage, flocculated with a flocculating agent and separated from the wash liquor, and the washed red mud is then washed in a final wash stage with a final wash liquor comprising $Na_2CO_3$ in an amount of at least 10 g/l, flocculated with a final flocculating agent and settled in which lime is included in the wash liquor of the final wash stage and the flocculant in that stage is a copolymer of 50–85% weight anionic monomer selected from acrylic acid and alkali metal and ammonium salts thereof and 50–15% acrylamide.

11. A process according to claim 10 in which the copolymer flocculant is added to the slurry in an amount of 0.5 to 20 mg/l.

12. A process according to claim 11 in which the red mud from the final wash stage is settled by mud stacking.

* * * * *